United States Patent [19]

Niijima et al.

[11] Patent Number: 5,787,493
[45] Date of Patent: Jul. 28, 1998

[54] CONTROL METHOD AND APPARATUS FOR DIRECT EXECUTION OF A PROGRAM ON AN EXTERNAL APPARATUS USING A RANDOMLY ACCESSIBLE AND REWRITABLE MEMORY

[75] Inventors: Hideto Niijima, Tokyo; Akashi Satoh, Kamifukuoka, both of Japan

[73] Assignee: International Business Machines Corporation, Armonk, N.Y.

[21] Appl. No.: 841,976

[22] Filed: Apr. 8, 1997

Related U.S. Application Data

[63] Continuation of Ser. No. 123,121, Sep. 17, 1993, abandoned.

[30] Foreign Application Priority Data

Sep. 25, 1992 [JP] Japan .................................. 4-256284

[51] Int. Cl.[6] ......................................................... G06F 12/00
[52] U.S. Cl. ........................... 711/204; 711/152; 711/163; 711/202; 711/205
[58] Field of Search ........................... 711/202, 205, 711/206, 163, 152, 204, 209

[56] References Cited

U.S. PATENT DOCUMENTS

| | | | |
|---|---|---|---|
| 5,088,026 | 2/1992 | Bozman et al. | 395/403 |
| 5,260,555 | 11/1993 | Sakamoto | 235/492 |
| 5,357,573 | 10/1994 | Walters | 380/25 |
| 5,379,417 | 1/1995 | Lui et al. | 395/575 |

OTHER PUBLICATIONS

"Software interface opens door for memory card applications" Computer Design v29 n13 p50, Jul. 01, 1990.
"Chips: Fujitsu in production with memory card controller IC' circuit ofers single–chip solutions" EDGE: Work–Group Computing Report v2 n71 p34, Sep. 30, 1991.

*Primary Examiner*—Eddie P. Chan
*Assistant Examiner*—T. V. Nguyen
*Attorney, Agent, or Firm*—Robert M. Sullivan

[57] ABSTRACT

With the present invention, the page table of the program code non-continuously placed in an external storage device using randomly accessible and rewritable memory is built into an executable sequence in a virtual address space of the CPU according to the execution order. By referring to the address translation tables, including the page table, the system is able to read the program from the external storage device, thereby executing the program. Therefore, the program can be executed without being loaded into main memory. Furthermore, the program and data can be managed without distinction.

Further, with the randomly accessible memory according to the present invention, since a sequence of real addresses of the CPU are assigned to the data area, control over the direct execution of the program can be simply achieved. Furthermore, since data and ECC parity can also be read and written sequentially, the system has good compatibility with a hard disk system. Since the data and Ecc parity are present on the same word line and can be accessed without changing the page address, simple control is achieved.

11 Claims, 12 Drawing Sheets

CONTROL METHOD AND APPARATUS FOR DIRECT EXECUTION OF A PROGRAM ON AN EXTERNAL APPARATUS USING A RANDOMLY ACCESSIBLE AND REWRITABLE MEMORY

The application is a continuation, of application Ser. No. 08/123,121, filed Sep. 17, 1993, now abandoned.

TECHNICAL FIELD OF THE INVENTION

This invention relates to a control method and an apparatus for direct execution of a program stored on an external storage device that uses a randomly accessible memory without loading the program into the main memory of the system.

BACKGROUND OF THE INVENTION

As disclosed in Japanese Patent Application Laid-open No. 2-292798 (1990), an external storage device using a randomly accessible and rewritable memory is utilized as a replacement for floppy and hard disk drives. Hereinafter, this type of external storage device is referred to as a Solid State Disk (SSD). A memory specialized for disk emulation for making merely sequential access possible can be used as an SSD, but a randomly accessible non-volatile memory (typically) developed as replacement for ROM is more often used.

In the past, there was no SSD which could function as a replacement for floppy and hard disk drives and which was provided with a function for executing a stored program without loading it into main memory by utilizing a capability for randomly accessing the memory. A system which can directly execute a program stored on a simple non-volatile memory card already exists. However, this type of memory card has no function as a replacement for a disk. Execute In Place (XIP) is described in JEIDA—Ver. 4.1, in which a memory chip is divided into an area for storing a directly executable program (the XIP partition) and another area (e.g. for FAT or another file system partition), which are used separately. However, only XIP applications (programs) can be stored in the XIP partition; other data, such as document data, cannot.

In general, an operating system uses a unit of a sector (typically 512 bytes) for managing data on the disk storage device. Therefore, there is no guarantee that a long file will be placed in a continuous area on the disk storage device. Because, for a program to be executed, the program code should be continuous in virtual address space, the prior art method cannot directly execute a fragmented program code on the disk storage device. Further, since a disk storage device is normally placed in an I/O address space of the CPU, it necessary to map executable data managed thereon to the memory space by some method (typically, by transferring the data to the main memory).

Furthermore, when an SSD is used as replacement for a disk device, a so-called system area for storing system data, such as the status and the error correction code (hereinafter referred to as ECC), and a data area for storing user data are mixed. As a result, the addresses in the data area become discontinuous and it is difficult to execute the program directly on the SSD. When the system area is not mixed, the data area and system area are located on different pages (word lines) data management becomes complex. Therefore, the effectiveness of an SSD compared with that of a hard disk drive is unclear.

OBJECTS AND SUMMARY OF THE INVENTION

In view of the foregoing, a primary object of the present invention is to provide a control method and an apparatus for direct execution of a program stored on an external storage device that uses a randomly accessible memory, without loading the program into the system's main memory.

Another object of the present invention is to provide a randomly accessible memory that can make an external storage device compatible with a disk drive.

These and other objects are achieved in this invention by providing a method for use with a computer system having a CPU that refers to virtual-real address translation tables, including a page table, and an external storage device that uses a rewritable and randomly accessible memory, wherein the external storage device is treated as being partitioned into logical pages when accessed as an I/O device, the size of the logical page is adjusted according to the size of a page managed by the CPU, and the logical pages of the external storage device are mapped to a real address space of the CPU, the pages being aligned with pages managed by the CPU. The method for controlling the execution of a program stored in the external storage device comprises the steps of:

building a page table to put the code of the program into an executable sequence in a virtual address space of the CPU; setting write-prohibit flags for prohibiting write operations on those logical pages of the external storage devices that contain the program; and referring to the virtual-real address translation tables, including the page table, to read the program out of the external storage device by using virtual addresses, thereby executing the program.

There is also provided according to the present invention a computer system comprising:

a CPU that refers to virtual-real address translation tables, including a page table;

an external storage device that uses a rewritable and randomly accessible memory;

wherein the external storage device is treated as being partitioned into logical pages when accessed as an I/O device, the size of the logical page is adjusted according to the size of a page managed by the CPU, and the logical pages of the external storage device are mapped to a real address space of the CPU, the pages being aligned with pages managed by the CPU;

the system further comprising:

means for building a page table to put the code of the program into a sequence in a virtual address space of the CPU; and means for referring to the virtual-real address translation tables, including the page table, reading the program out of the external storage device by using virtual addresses, and executing the program.

There is further provided according to the present invention a randomly accessible memory comprising: a plurality of memory cells partitioned into a first area a second area, a sequence of real addresses of said CPU being assigned to memory cells of said first area;

a plurality of word lines, each of which is shared by said plurality of memory cells;

access means operable in a first mode in which memory cells of said first area corresponding to real addresses of said CPU are accessed randomly, and in a second mode in which memory cells of said first and second areas are accessed sequentially.

The foregoing and other features and advantages of the invention will be apparent from the following more particular description of preferred embodiments of the invention, as illustrated in the accompanying drawings.

DETAILED DESCRIPTION

Although the present invention will now be described with reference to a computer system that operates on the PC-DOS operating system of IBM using an Intel 80386DX as CPU, the present invention is not limited to such operating system and CPU.

Figure 1:
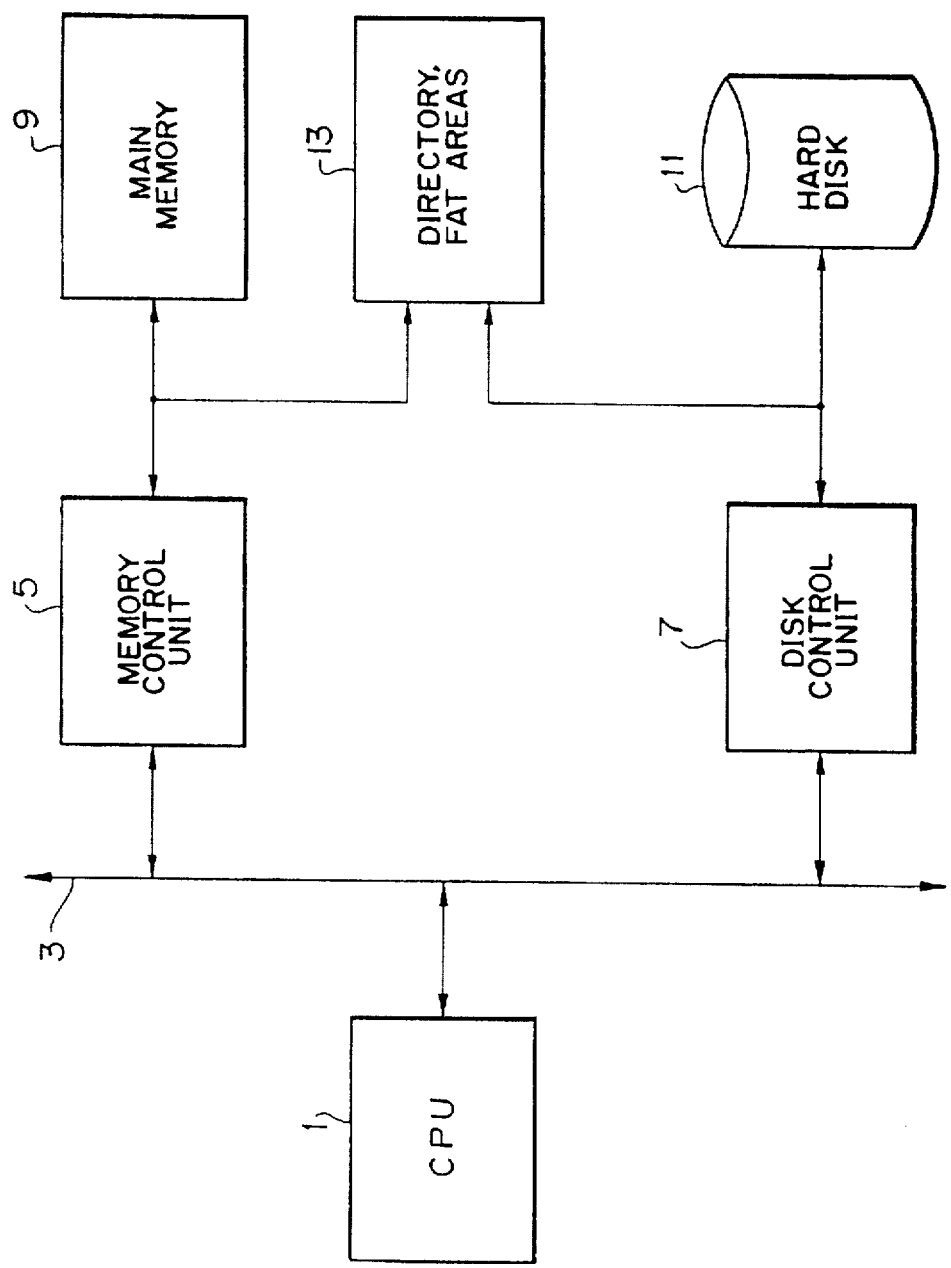
FIG. 1 is a block diagram showing the structure of a computer system embodying the present invention.

FIG. 1 is a block diagram showing the structure of an embodiment according to the present invention. A central processing unit (CPU) 1 is connected to a memory control unit 5 and a disk control unit 7 through a system bus 3. The memory control unit 5 is connected to a main memory 9, and the disk control unit 7 is connected to a hard disk unit 11. The main memory 9 is mapped to a memory space, and the hard disk unit 11 is mapped to an I/O space. The memory control unit 5 and the disk control unit 7 are also connected to a solid stated disk (SSD) 13 having a file system including a directory and a file allocation table (FAT). Therefore, the SSD 13 is accessible from the CPU 1 through the memory space, as with the main memory 9, and is also accessible through the I/O space, as with the hard disk unit 11 enabling the SSD 13 to function both as a main memory and as an I/O unit (hard disk unit). Access to the SSD 13 through the memory space will be described later with reference to FIG. 5.

A flash EEPROM is typically used as a randomly accessible and rewritable memory in the SSD 13. Alternatively, a DRAM or SRAM with battery back-up can also be used. A further alternative is to use a randomly accessible memory employing semiconductor memory techniques such as a ferro-electric memory or a magneto-resistive memory.

Figure 2:
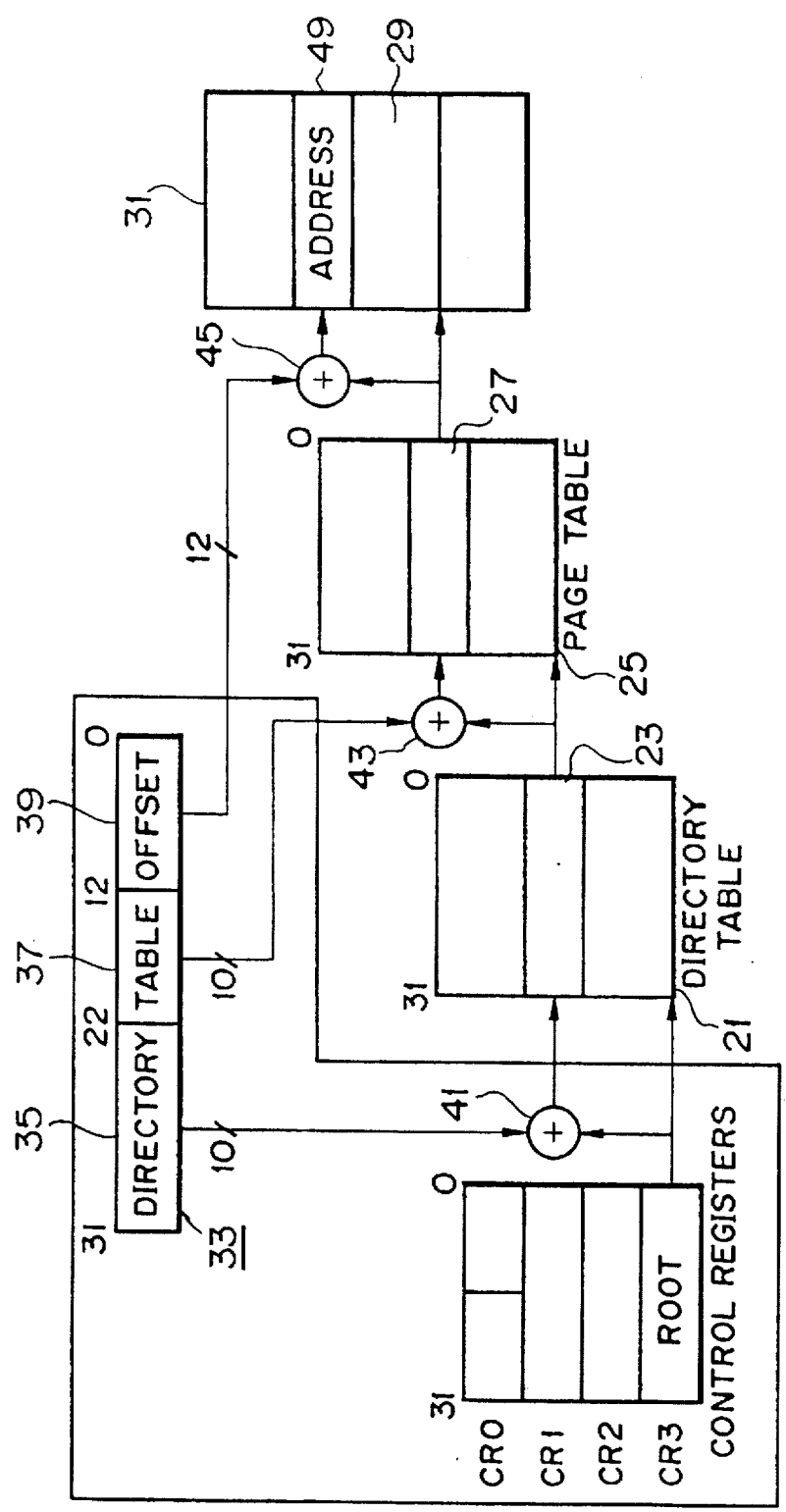
FIG. 2 is a block diagram showing the paging mechanism in the CPU in FIG. 1.
Figure 3:
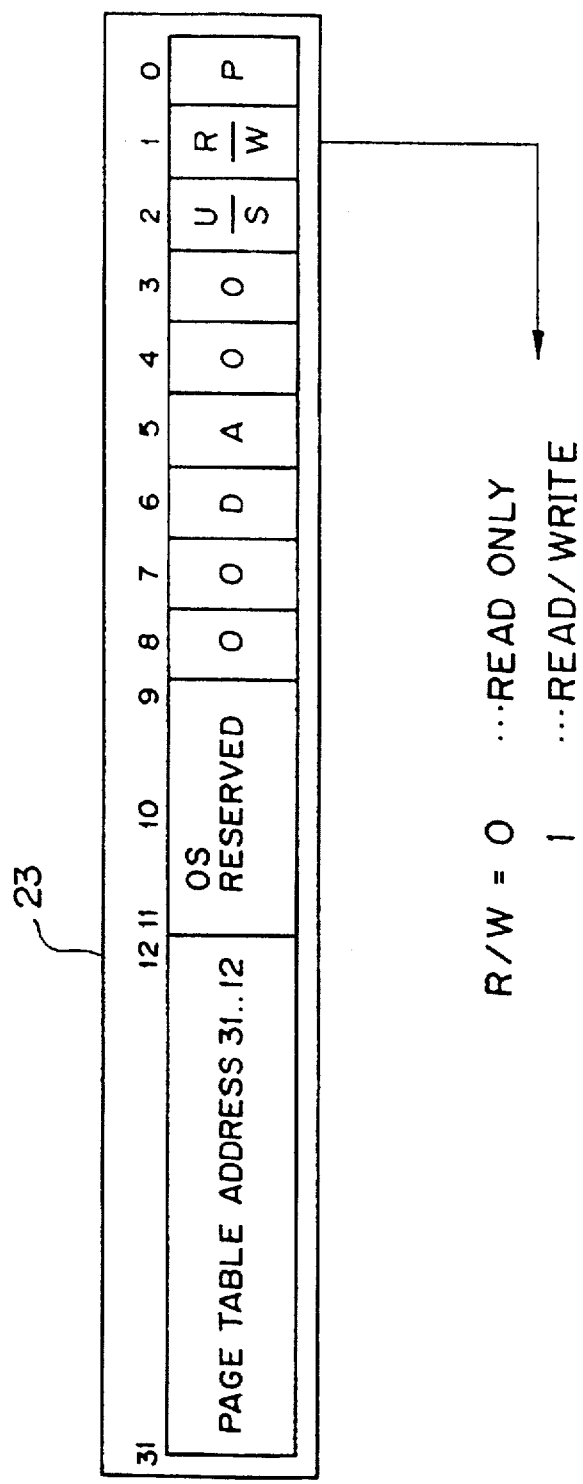
FIG. 3 is a schematic illustration showing the structure of a directory table entry.

FIG. 2 is a block diagram showing a paging mechanism for the CPU 1, quoted from a manual of the Intel 80386 microprocessor. A control register CR3 stores page addresses of a directory table 21. The directory table 21 contains 4K bytes, consisting of 1,024 32-bit directory table entries 23. The directory table entry 23 has the structure shown in FIG. 3. Specifically, bits 0–8 are set for various information necessary for paging, bits 9–11 are reserved for the system program and bits 12–31 store the base addresses of a page table 25 in real addresses. Of bits 0–8, the first is an R/W bit, which is written with 1. This sets the corresponding page table to read/write enable.

Figure 4:
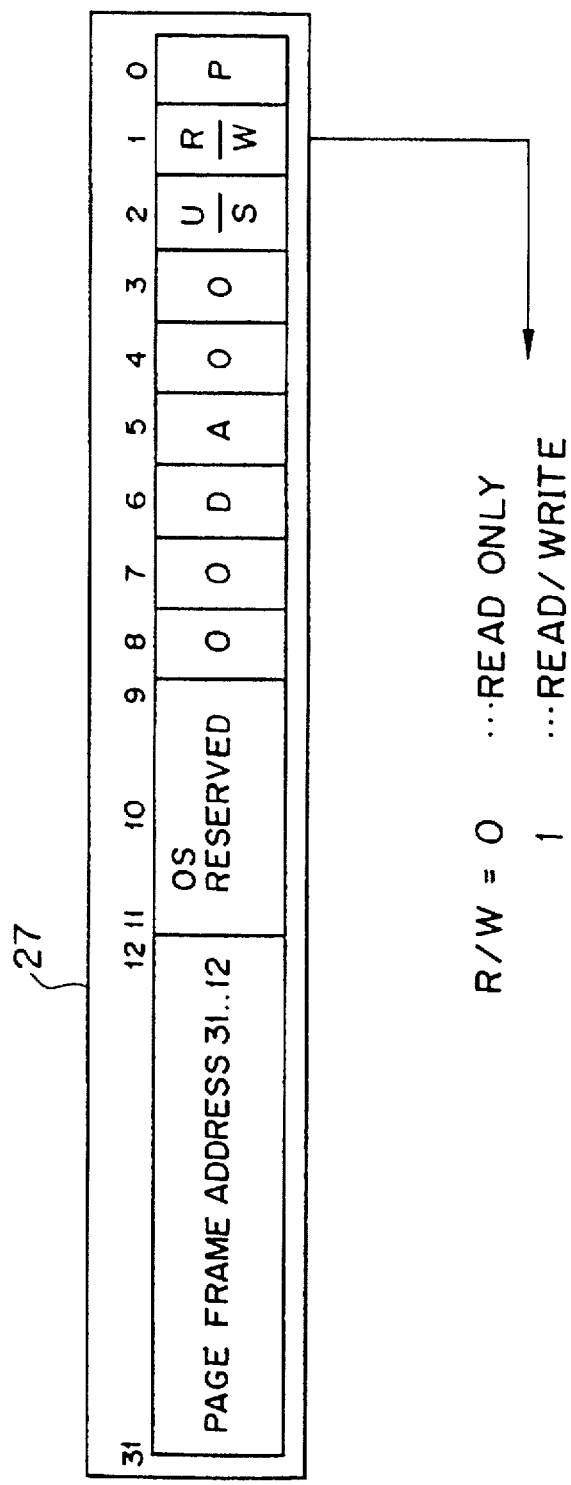
FIG. 4 is a schematic illustration showing the structure of a page table entry.

The page table 25 has a similar structure, storing 1,024 32-bit page table entries 27. Each page table entry has the structure shown in FIG. 4. Specifically, bits 0–8 are set for various information necessary for paging, bits 9–11 are reserved for the system program and bits 12–31 store the base addresses of the page table 25 in real addresses. Of bits 0–8, the first is an R/W bit, indicating that the corresponding page is only read enabled (0) or read/write enabled (1).

The directory table 23 and the page table 25 are provided in the main memory 9. There are further provided in the main memory 9 a plurality of page frames 29. The SSD 13 is divided into a plurality of logical pages. The size of a logical page of the SSD 13 that is mapped to a real address space of the CPU 1 is 4k bytes, adjusted according to the size of the page managed by the CPU 1. Since the ordinary sector size of the SSD 13 is 512 bytes, eight sectors are formed as one cluster, which is the size of a logical page of the SSD 13 as viewed from the CPU 1. However, one sector may be managed as 4KB. Information on a cluster or sector is written in the root sector of the SSD 13. As will be described later, real logical page of the SSD 13 also stores non-mapped data (e.g. ECC) in addition to the mapped 4K bytes (data of the data area).

It is to be noted that each logical page of the SSD 13 is mapped to a real address space 31 of the CPU 1 and, in that real address space, is set so that its boundary is aligned with the boundary of the page managed by the CPU 1. For example, the 80386 microprocessor has 32-bit address lines and thus has a real address space of 4 GB. Between several MBs and several tens of MBs are assigned according to the capacity of the SSD 13 and set in the real address space so that the address offset value of a logical page of the SSD 13 is always aligned with that of a page managed by the CPU 1. As a result, each logical page on the SSD 13 is mapped to a predetermined position in the real address space (FIG. 5).

The virtual (logical) address of the CPU 1 is given as a 32-bit linear address 33. The linear address 33 comprises three parts: a directory address 35 (bits 22–31), a table address 37 (bits 12–21), and an offset address 39 (bits 0–11). The directory address 35 is added in an adder 41 to the base address of the directory table 21 supplied from the control register CR3, and indicates one entry 23 in the directory table 21. The table address 37 is added in an adder 43 to the base address of the page table 25 shown by the above indicated entry 23, and indicates one entry 27 in the page table 25. The offset address 39 is added in an adder 45 to the base address of the page shown by the above indicated entry 27 to produce a real physical address 49. Thus, the real address 49 is formed from the virtual address 33.

Figure 5:
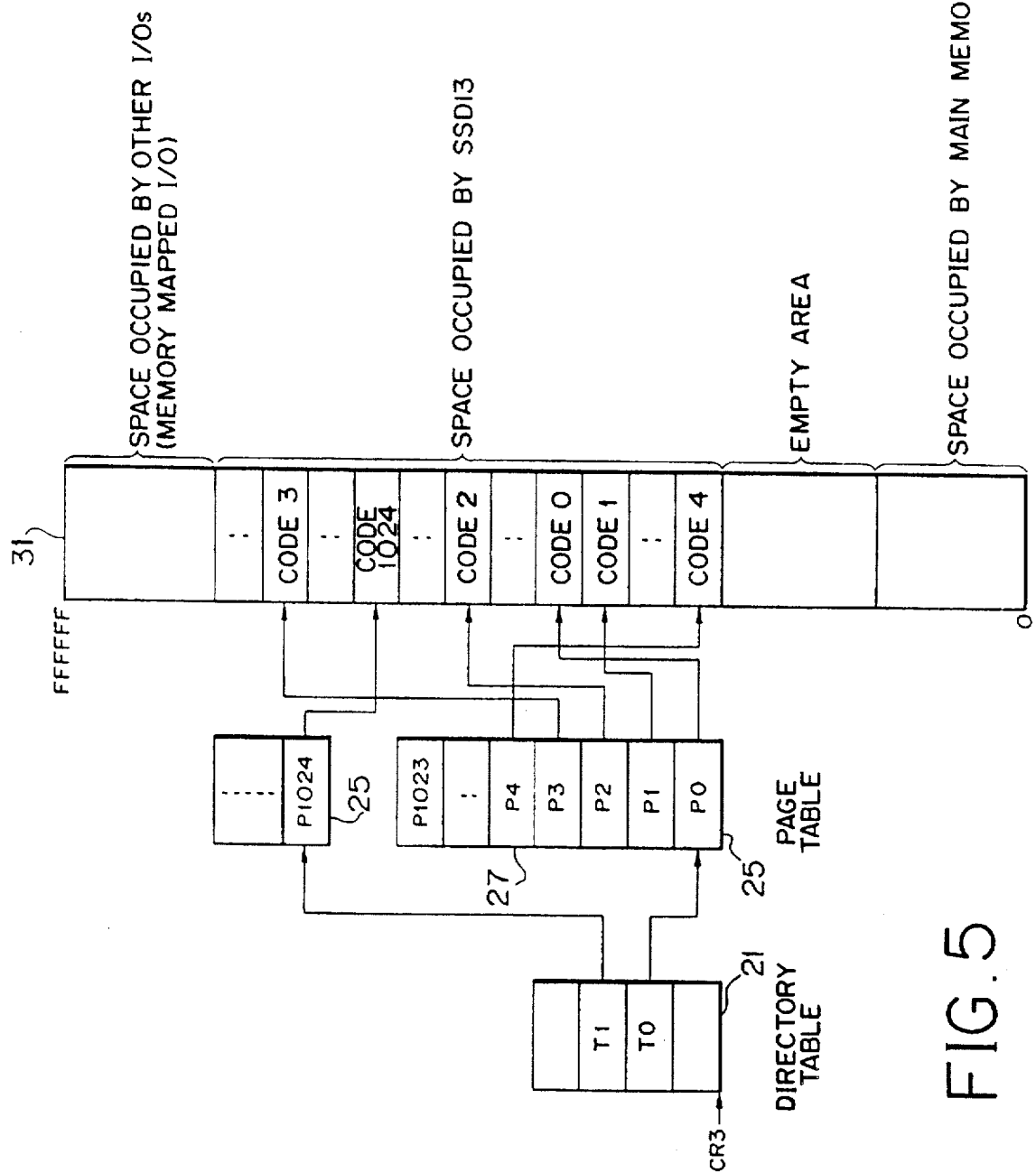
FIG. 5 is a schematic illustration showing a method of arranging program data by using a paging mechanism.

FIG. 5 is a schematic illustration showing the relationship between a logical page of the SSD 13 in real address space 31 and entry 27 of the page table 25. Executable data, that is, programs for storing logical page Code 1, Code 2, . . . , Code 1023 and Code 1024, are randomly and discontinuously placed on the SSD 13. On the other hand, the page table 25 is rearranged so that a first entry P0 specifies the base address of page Code 0, a second entry P1 specifies that of page Code 1, and so on. As a result, the CPU 1 is able to execute the program by reading pages P0 to P1024 of the discontinuous executable program in the virtual address space as though it were continuous.

Figure 6:
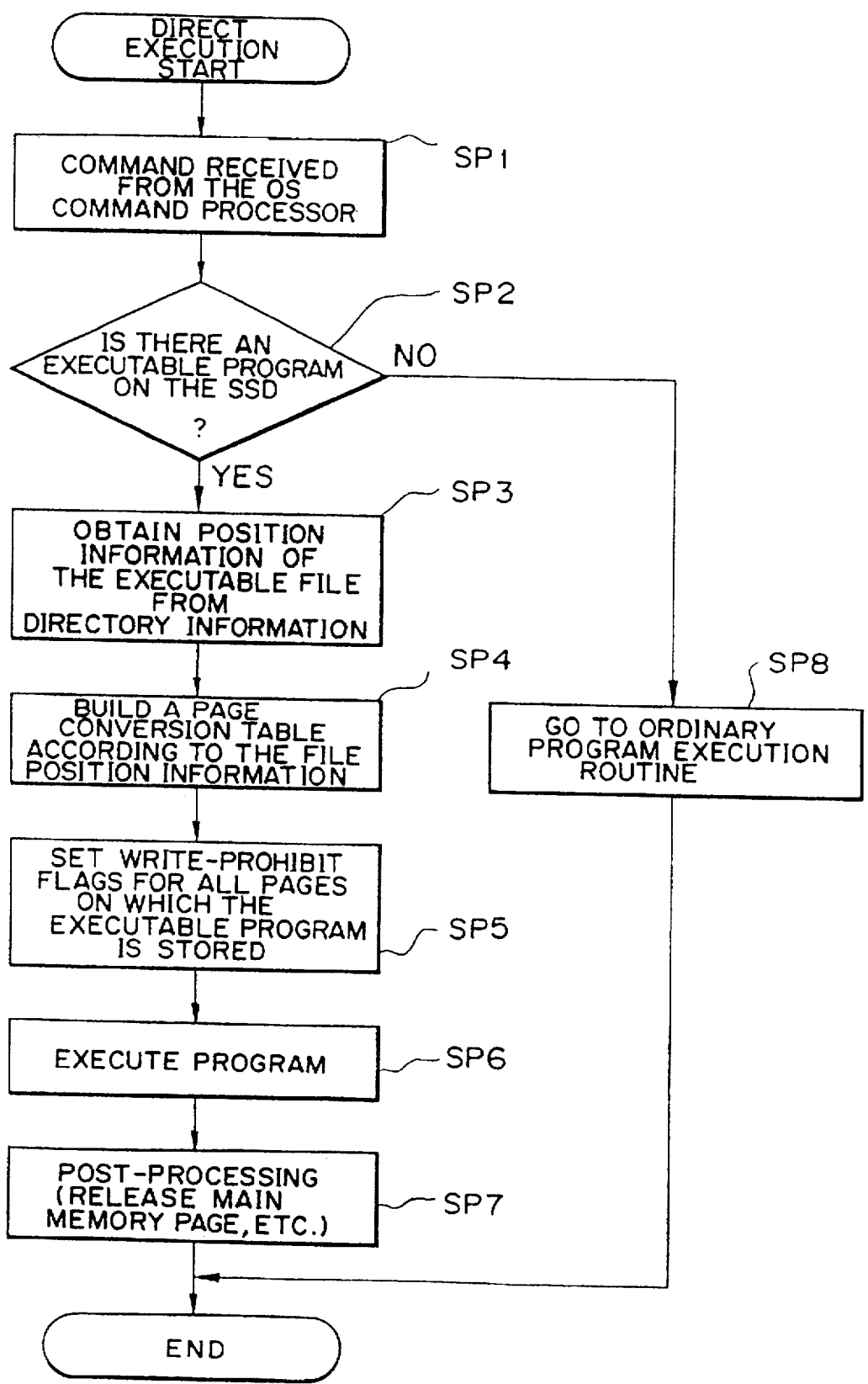
FIG. 6 is a chart showing the flow of the construction of a page table and direct execution of a program.

FIG. 6 shows the flow of the formation of the page table 25 and program execution. The program that is run in this case is an SSD device driver program for converting a sector number of the SSD 13 into a real address, or a program for managing direct execution of an executable program on the SSD 13, both of which are called management programs in the present invention.

When the management program receives a command from the command processor of the operating system in step SP1, it determines in step SP2 whether or not an executable program corresponding to the command is present on the SSD 13. This can be determined by checking the disk descriptor. When it is directly executable, the management program, in step SP3, refers to the file managing area on SSD 13 to obtain a map showing the location of the executable file. For example, the management program recognizes from the directory and file allocation table (FAT) that an executable program corresponding to the command is stored on logical pages 1, 7 and 3, in that order, of the SSD 13. Access to the directory and FAT is made through the disk control unit 7 (FIG. 1). Then, in step SP4, the management program rewrites the page table as shown in FIG. 5. In the above example, the base addresses of pages 1, 7 and 3 mapped to the real address space of the CPU 1 are written in entries P0, P1 and P2. Unusually, an entry of a page table appropriately uses blank ones.

When the page table 25 is thus rewritten, the management program, in step SP5, sets write-prohibit flags for all logical pages on which the program to be executed is stored. Specifically, all entries (in the above example, P0, P1 and P2) related to the program in the page table 25 are set to 0. The reason for setting write-prohibit flags is as follows. Some variables are allocated in a program area that contains a portion of the executable data. Changing the variables by execution of the program modifies the original program, which is loaded in the main memory. However, since an SSD is normally realized by using a semiconductor memory that cannot be written randomly, direct writing into a program on an SSD involves a very large overhead. Furthermore, once written, the values may become initial values in the next execution, disturbing execution of the program. In order to eliminate such problems, it is necessary to write-prohibit the program-storing pages of the SSD. For the 80386 microprocessor, these attributes can be achieved by setting the R/W bit to 0 in individual entries in the page table, provided that the R/W bit of each entry in the directory table is set to 1, as mentioned above.

After completion of the above preparation, the management program executes a program corresponding to the above command in step SP6. Specifically, real addresses on the SSD 13 are sequentially produced by the mechanism shown in FIG. 2, and the addresses are accessed to read the executable program which executes sequentially. In practice, the CPU 1 outputs a read command including the produced real addressees to the memory control unit 5. From the real addresses received, the memory control unit 5 determines that the command is to be directed to the SSD 13, and it therefore outputs the read command, including the real addresses, to the SSD 13. In this case, the page advances in the order of entries (P0, P1, P2 and so on) to the next page in the page table 25 but, because the corresponding pages are discontinuous on the SSD 13, the logical pages are accessed discontinuously.

After the completion of program execution, the management program carries out post-processing in step SP7. Specifically, pages allocated in the main memory 9 by page copying, which will be described later, and the work area being used are released. Page table entries that become unnecessary are also released. When no executable program is present on the SSD in step SP2, the procedure passes through step SP8 to the ordinary program execution routine.

Figure 7A:
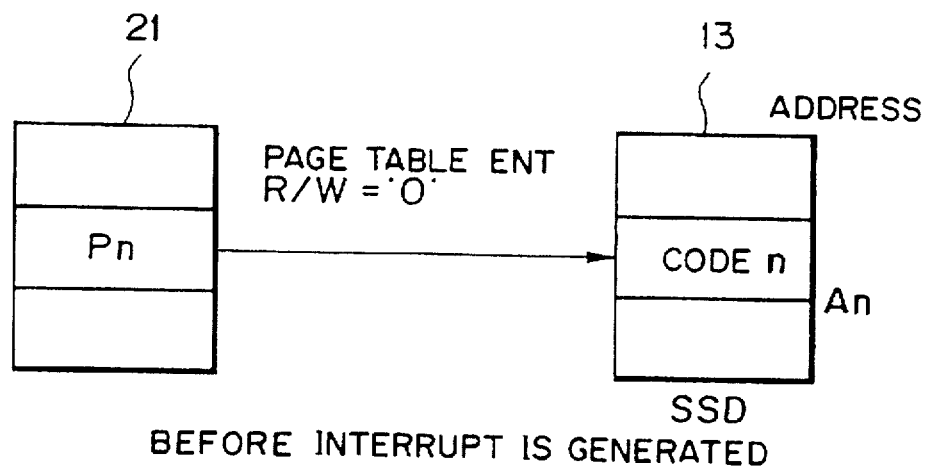
FIGS. 7A and 7B are schematic illustrations showing write-prohibit exceptional processing when a write is made to the SSD in order to store a program during direct execution of the program.
Figure 7B:
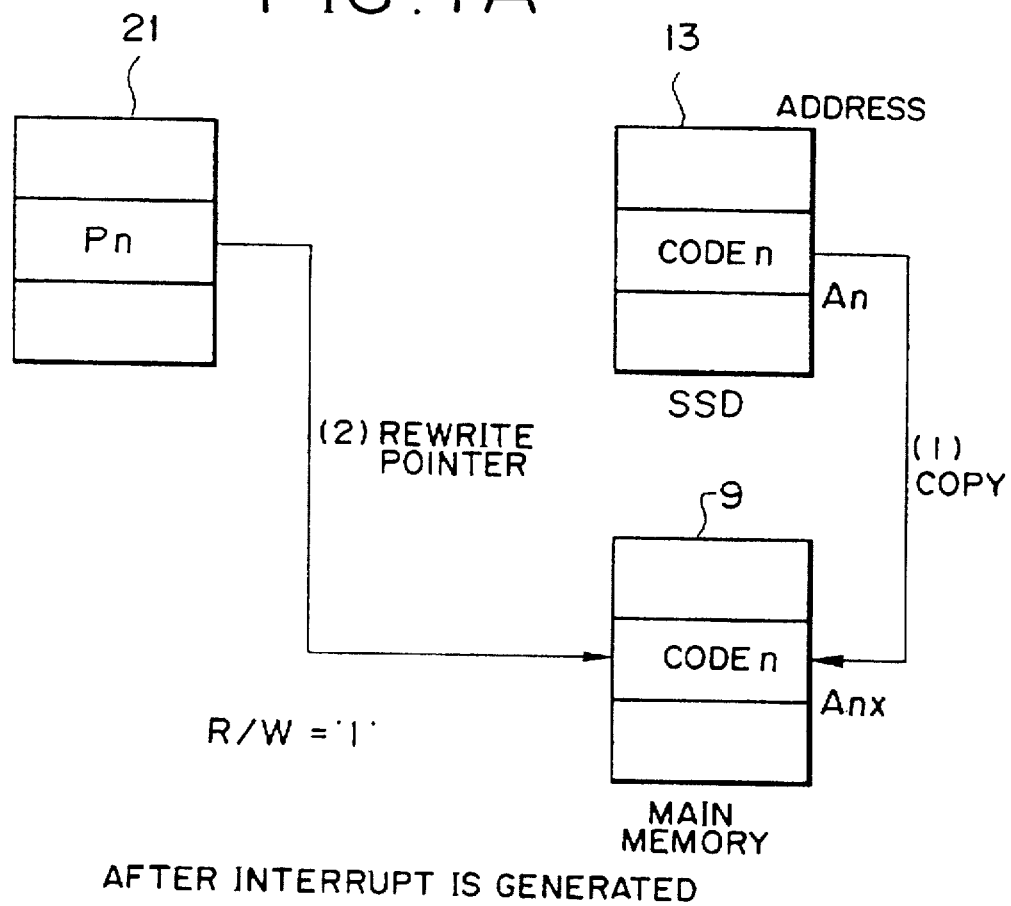

FIGS. 7A and 7B are schematic illustrations showing conditions before and after a write-prohibit interrupt is generated, respectively. Because all of the pages on which the program to be executed on the SSD 13 is stored are set for write-prohibit, this interrupt is generated by the system if a write is made to the executable program on the SSD 13.

Before an interrupt is generated, the base address An of the page Code n of the SSD 13 is designated by entry Pn of the page table 25, and thus a program stored on this page is directly executed. In this case, if a write is made to the page Code n of the SSD 13, a write-prohibit interrupt is generated, and the condition changes to that of FIG. 7B. That is, the management program (1) copies the data area of page Code n of the SSD 13 into the main memory 9, and (2) rewrites entry Pn of the page table 25 so that it indicates the base address Anx of the copied page in the main memory 9. The page address Anx can be appropriately selected from an unused area of the main memory 9. Further, the R/W bit of entry Pn is set to 1, which makes it read/write enable.

Figure 8:
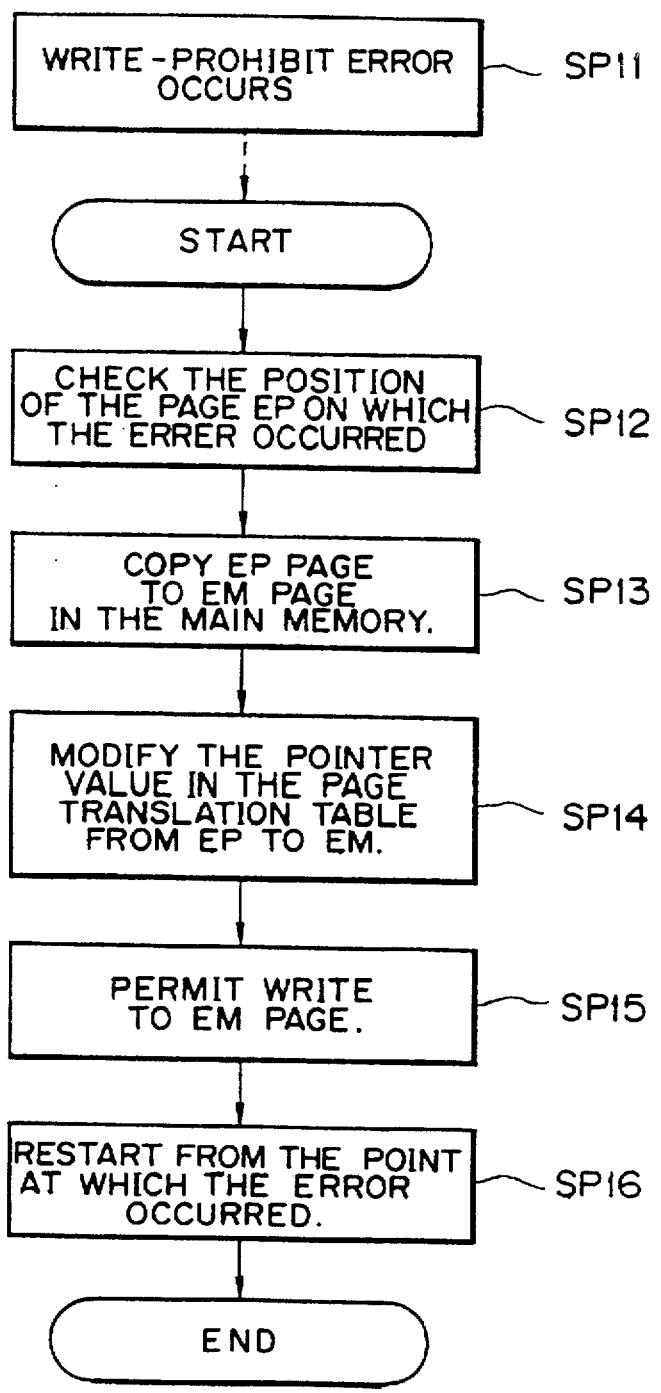
FIG. 8 is a chart showing the flow of the write-prohibit exceptional processing shown in FIGS. 7A and 7B.

FIG. 8 is a flow chart showing the operation of the CPU 1 when a write-prohibit interrupt is generated. When a write-prohibit error is generated in step SP11, an interrupt-processing program, in step SP12, confirms the position of the logical page on which the error occurred, that is, the position of page Ep, to which the write was made, on SSD 13. Then in step SP13, the data area of logical page Ep is copied to page Em in the main memory 9. Further, in step SP14, the entry that indicated page Ep in the page table 25 is updated so that it indicates page Em. Next, in step SP15, the R/W bit of this entry is set to 1, which permits page Em to be written. When an environment that allows normal execution is established, the interrupt-processing program in step SP16 resumes processing from the address at which the error occurred. Because writing this page is permitted after it has been transferred into the main memory 9, a write-prohibit interrupt will never be generated afterwards, even if a write is made to this page.

When a whole sector of the SSD 13 is protected by ECC prior to processing of the executable program, the executable program may be read into the main memory 9 as a set of data on an external storage device and executed after it has been confirmed that there is no ECC error. However, data that have been read into the main memory are subsequently discarded.

When a recoverable read error is generated in this ECC check, the whole data area of the logical page containing the sector in which the error occurred is copied into the main memory, after error recovery processing on the SSD 13. At the same time, the copied page in the main memory is registered in the page table 25 in place of the page on the SSD 13 that caused the read error, and processing of the executable program begins.

To achieve such processing, it is preferable to use a randomly accessible memory in which only a data area has continuous addresses in the real address space of the CPU. That is, in random access, it is preferable to use a memory in which only the data part of a sector is visible, and in which ECC parity can be read and written only in other special modes (e. g. column mode and nibble mode). The next embodiment is related to such a randomly accessible memory.

Figure 9:
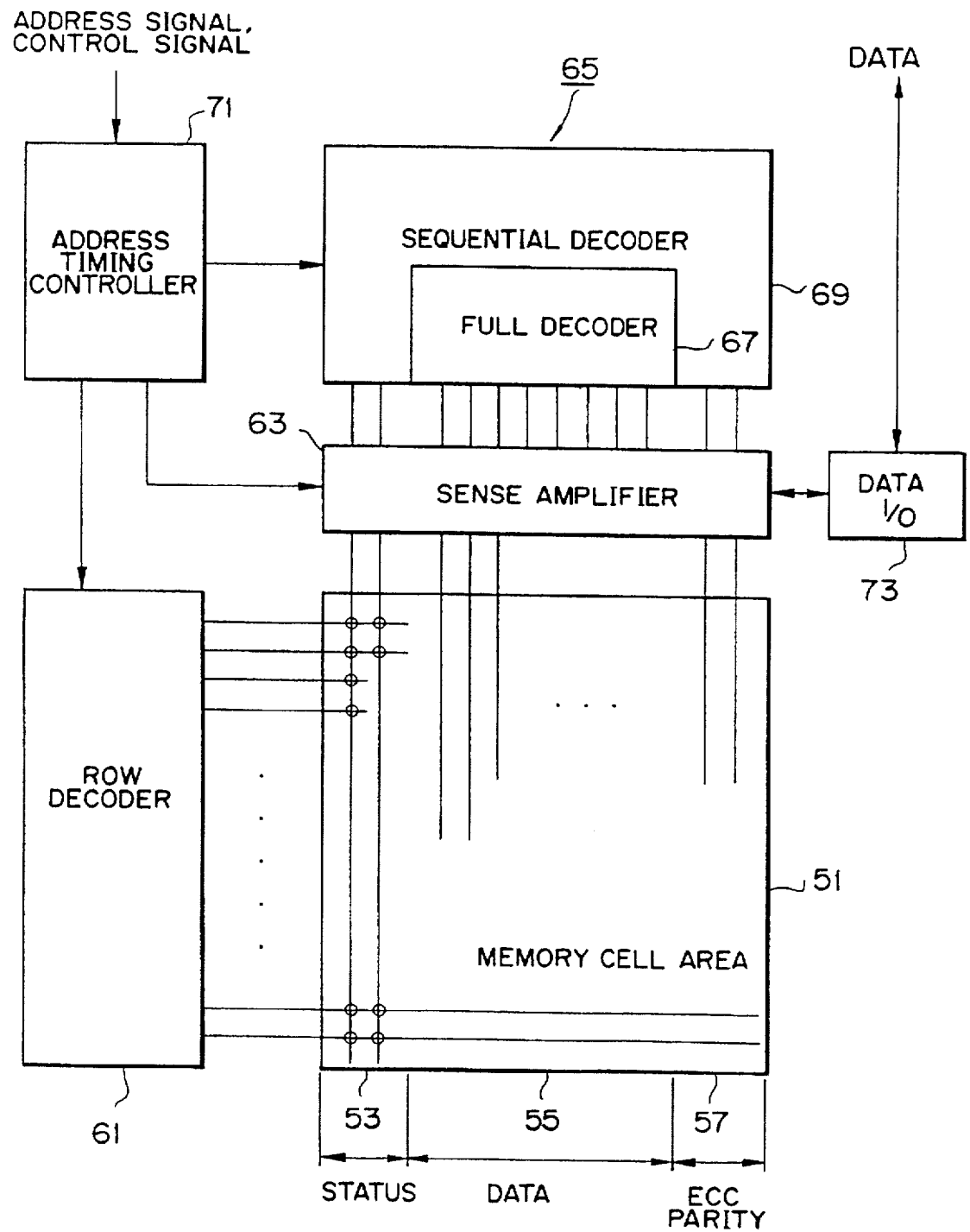
FIG. 9 is a block diagram showing the structure of an embodiment of the randomly accessible memory according to the present invention.

FIG. 9 is a block diagram showing the structure of a flash memory chip according to the present invention. The SSD 13 (FIG. 1) of the above embodiment generally comprises a memory chip array and a control part (not shown) associated therewith. A memory cell area 51 having a single common word line is divided into three areas: a status area 53, a data area 55, and an ECC parity area 57. The status area is a management area used to store management information indicating the validity, invalidity, and so on of the data on the same word line, and all of the information is necessarily read at the time of the system power-up. The data area is used to store data that are visible to the user, and the ECC parity area is a management area that is used to store code for error correction. In this case, typical lengths of the status, data, and ECC parity area are 6 bytes, 512 bytes, and 10 bytes, respectively.

Figure 10:
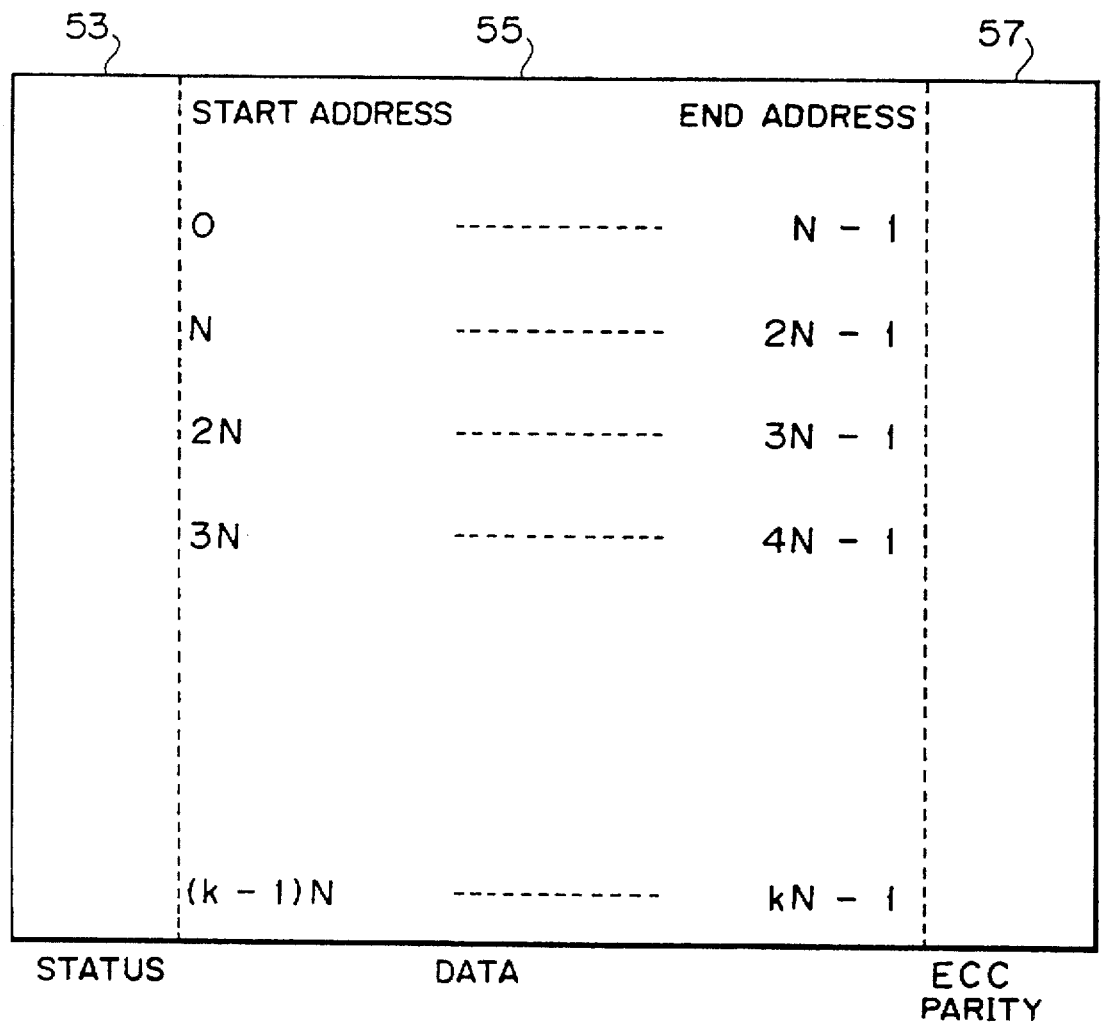
FIG. 10 is a schematic illustration showing the CPU real addresses assigned to the randomly accessible memory shown in FIG. 9.

The memory cell area has the structure shown in FIG. 10. Each row of the memory cell area 51 forms one word line, that is, one physical page, and each word line is divided into the three areas described above. Real addresses of the CPU are continuously allocated to the data of each word line. That is, where N is the length of the data area, and k is the number of word lines, continuous real addresses from 0 to (N-1) are allocated to the first word line, from N to (2N-1) to the second word line, . . . , and from (k-1)N to (kN-1) to the last word line. On the other hand, no real addresses are allocated to the status area 53 or the ECC parity area 57.

With reference once again to FIG. 9, individual word lines of the memory cell area are connected to a row decoder 61, and individual columns (bit lines) are connected to a column decoder 65 through a sense amplifier 63. The column decoder 65 is provided with a full decoder (random decoder) 67 for randomly accessing only the data area 55, and a sequential decoder 69 for sequentially accessing the status, data and ECC parity areas. The decoders 61 and 65 and the sense amplifier 63 are controlled by an address timing controller 71. The sense amplifier 63 is connected to a data I/O buffer 73. The length of the data area 55 is the Mth power of 2 (where M is a natural number such as M=8), and it is sufficient for the full decoder 67 to select one bit line related to real addresses of the CPU, thus creating a simple structure. On the other hand, the sequential decoder 69 may be designed by using shift registers. Alternatively, the status and ECC parity areas may be individually provided with full decoders so as to select bit lines over the three areas by using an on-chip address generator. In this case, the sequential decoder 69 may select the bit line of the data area by utilizing the full decoder 67.

Thus arranged, the semiconductor memory operates in two modes: a random access mode and a sequential access mode. The operation of the semiconductor memory will be described in terms of these modes. The selected mode is indicated by the above control unit (not shown) of the SSD when a command is output to the chip.

In FIG. 1, the semiconductor memory on the SSD 13 is normally in the random access mode. When the CPU 1 accesses the SSD 13 through the disk control unit 7, the control unit of the SSD 13 outputs a command indicating sequential access to the specified memory chip, and after completion of the processing, outputs a command indicating random access. When the CPU 1 accesses the SSD 13 through the memory control unit 5, the control unit of the SSD 13 does not normally mediate. Thus, the semiconductor memory of the SD 13 is accessed in the random access mode.

Random Access Mode:

In the random access mode, only access to the data area 55 is possible. As explained above, in the data area 55, real addresses of the CPU are continuously allocated. This mode is necessary for direct execution of a program on an external storage device, as explained in the above embodiment, and access to the status and ECC parity areas 53 and 57 becomes impossible.

In the mode, the address timing controller 71 receives an address signal and a control signal from the control unit (not shown) of the SSD 13, transmits the address signal to the row decoder 61, selects a desired 1 word line, and then transfers the information contained in the whole word line to the sense amplifier 63. An address signal is then sent to the full decoder 67 in order to select specified information from that already held in the sense amplifier, and the specified information is supplied to the data I/O buffer 73.

In step SP6 of the flow chart shown in FIG. 6, it is necessary to hide the status and ECC parity ares 53 and 57 of the memory cell area 51. If this is not done, the CPU 1 conducts interrupt control at every boundary of 1 word line (physical page) in order to skip the ECC parity area 57, which involves a large overhead. Furthermore, since control of direct execution by the above embodiment uses the paging mechanism of the CPU 1, control action such as matching of a CPU page against a physical page of the SSD become necessary, thus increasing the amount of hardware. Since, in the present embodiment, only the data area is made randomly accessible, such disadvantages can be eliminated.

Sequential Access Mode:

In the sequential access mode, the status, data, and ECC parity areas 53, 55, and 57 of 1 word line are continuously accessed. Random access is not required in an SSD mode where data on the SSD 13 is accessed through the disk control unit 7, but it must be possible to continuously read and write data in both the data area 55 and the ECC parity area 57. The SSD mode is necessary in SP3 of the flow chart shown in FIG. 6. The sequential access mode is necessary to achieve this. When the sequential decoder is in the form of a shift register, the status, data, and ECC parity areas of a word line (physical page) can be continuously accessed by providing the addresses of the word line once at the beginning. Alternatively, the first memory cell can be specified by the on-chip address generator, and from that address to the end of the word line can be continuously accessed.

In this mode, the address timing controller 71 receives an address signal and a control signal from the control unit (not shown) of the SSD, sends that address signal to the row decoder 61, selects a desired 1 word line, and then transfers the information contained in the whole word line to the sense amplifier 63. The information held in the sense amplifier is then successively outputted through the data I/O buffer 73.

Figure 11:
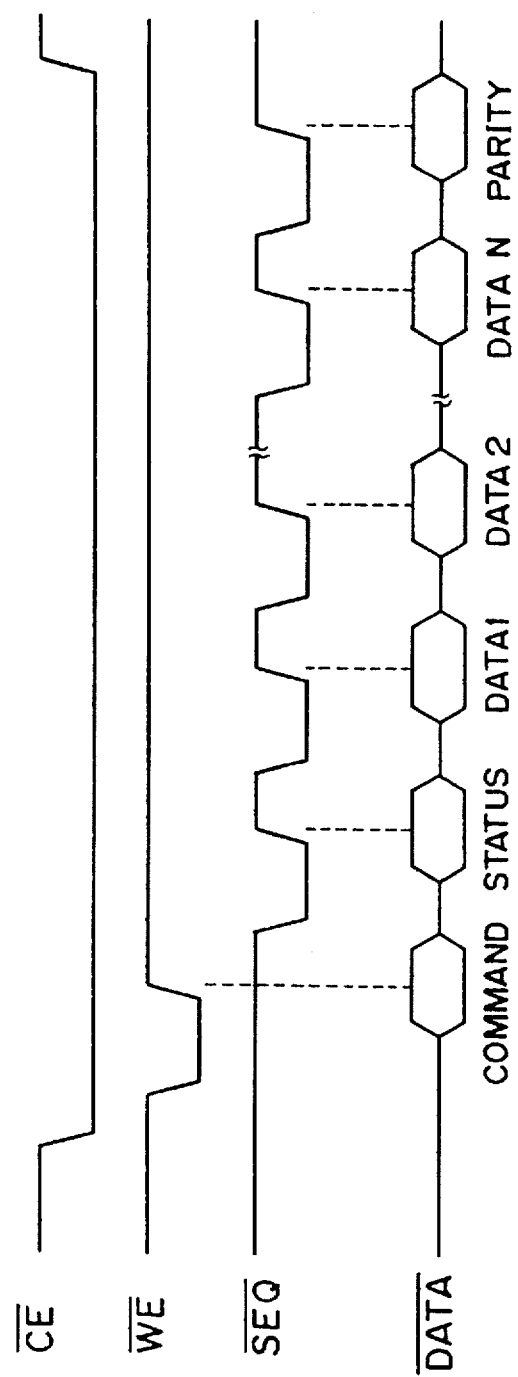
FIG. 11 is a timing chart showing the access sequence when the data contained in the whole area, including the status area, are read in a sequential access mode in the randomly accessible memory shown in FIG. 9.

FIG. 11 shows an example of an access sequence in the sequential access mode of the memory chip, in which the status, data, and ECC parity are sequentially read. In this Figure, CE is an abbreviation of chip enable; WE, of write enable; and SEQ, of sequence toggle. In addition, Data refers to the data transferred via the data I/O buffer 73.

Figure 12:
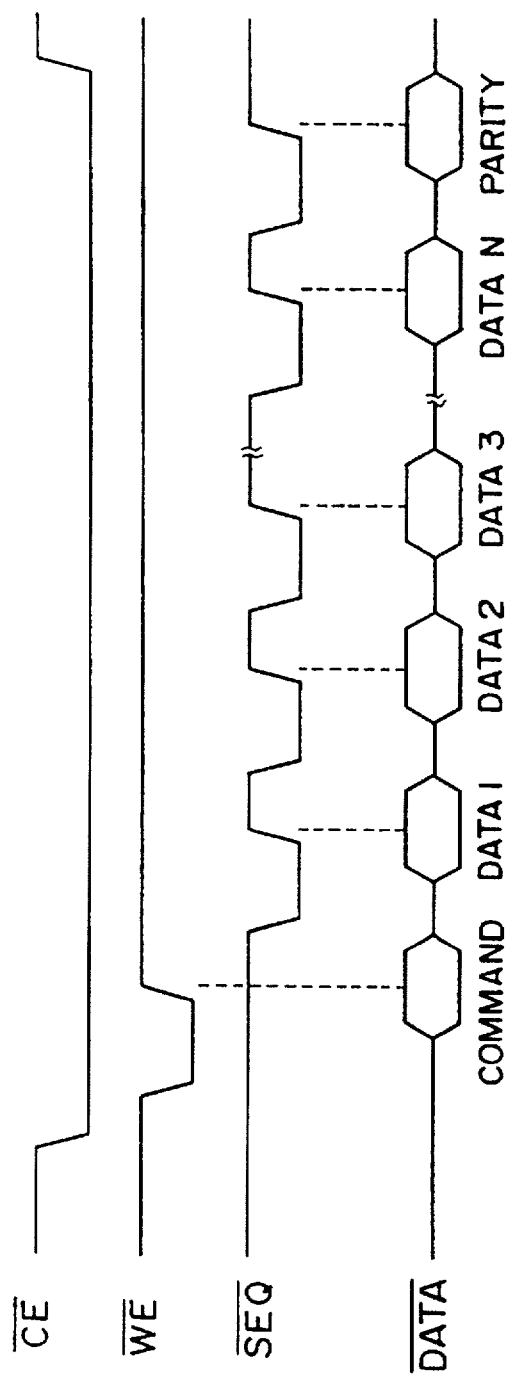
FIG. 12 is a timing chart showing the access sequence when data in areas other than the status area are read in a sequential access mode in the randomly accessible memory shown in FIG. 9.

FIG. 12 shows another example of an access sequence in the sequential access mode, in which data and ECC parity, but not the status, are sequentially read. The reading status is required only when the system is powered up and may be skipped in other cases.

Selection of the random access mode or the sequential access mode, or selection of one of the operations shown in FIGS. 11 and 12 in the sequential mode, is realized by software implementation of a command. In currently produced flash EEPROM chips, an external command is given for mode selection of erase, write, read, and the like. These command input terminals are used unchanged to achieve the above selection. This method can realize mode selection by software without requiring many changes to the hardware. However, it is also possible to increase the number of input pins to realize mode selection by means of input signals to the pins. When mode selection is implemented on software by a command form, changing the method of inputting the address of the first memory cell to be read allows simple selection to be achieved for the case in which the data are sequentially read from the first status (FIG. 11) or from halfway (FIG. 12). This can eliminate some of the overhead, when the SSD 13 is accessed from the disk control unit 7, by skipping status reading in the SSD mode.

Because, in general, the physical page length of a semiconductor memory is the Mth power of 2, such as 256 or 512 bytes, the number of pins needed for inputting page addresses is exactly M. However, sectors of the hard disk to be emulated by the SSD include both data and ECC parity areas, and the length is not the Mth power of 2. Therefore, when an ordinary semiconductor memory is used to realize an SSD and the physical page and sector correspond one to one, the status and ECC parity overflow the physical page and a special control is required. To prevent this, in the present embodiment, the status and ECC are permitted to use only continuous access in the sequential mode, thereby enabling simple access to a physical page whose length is not the Mth power of 2. If page access is achieved by full decoding, row addresses must be externally inputted one by one to all memory cells included in the physical page. Moreover, because the number of addresses is not the Mth power of 2, the number of address pins increases and the input pattern is irregular. The present embodiment, on the other hand, involves no such problems.

Data write is achieved by transferring data of one word line to the sense amplifier 63 through the data I/O buffer 73, and then transferring an address indicating the word line through the row decoder. Data write may be limited to the SSD mode.

The structure of the semiconductor memory shown in FIGS. 9 and 10 can also be used for an non-rewritable randomly accessible memory.

Some of the various advantages of the embodiment described above are as follows: First, when program execution is controlled as shown in FIGS. 1 to 8, the following effects can be achieved:

(1) A program can be executed without being loaded into a main memory.

(2) Programs and data can be managed without any distinction being made between them. That is, the present embodiment requires no tedious work of selecting areas for performing a read/write operation, as in the prior art system; data management is simplified; and the user interface is superior.

(3) Because direct execution is controlled by using the paging mechanism provided in the existing CPU, it does not require large-scale hardware, and can be achieved purely by software development. Therefore, the embodiment involves a minimal increase in cost.

(4) An application program is not required to be loaded into the main memory, and the system is not required to have a large-capacity main memory.

Recently, in notebook-type personal computers and the like with small form factors, the main memory is required to have a large capacity because application programs have become large. As a result, such systems are equipped with an increased number of DRAM chips, which is an impediment to low-power operation. However, when the program is directly executed on the SSD, a smaller capacity of the main memory is sufficient for work data, and the number of DRAM chips can be considerably reduced. Furthermore, since a large-capacity main memory is not required, circuits such as a refresh controller and an address multiplexer are considered to be unnecessary when the main memory is designed with SRAM, for example, and remarkably low-power operation is thus achieved. These factors are also important for the development of dedicated Microsystems for specific applications, which are expected to increase even further in the future.

(5) Simple rewrite of ROM-type IC cards. Recently, some application software for personal computers has been marketed in the form of IC cards and such packages are expected to be used increasingly in the future. Currently, they are supplied in the form of ROM cards, but more flexible systems can be designed by using an SSD that can be regarded as a disk unit.

Furthermore, with the randomly accessible memory shown in FIGS. 9 to 12, the following effects can be obtained:

(6) Because data and ECC parity can be continuously accessed, an external storage device can be made to match the disk unit well. Because data and ECC parity are present on the same word line (physical page), they can be accessed without changing the page addresses, and control is simplified.

(7) Because a sequence of real addresses of the CPU is allocated to the data area, direct execution of the program can be simply achieved.

(8) Because the status area is at the head of each word line, this area can be rapidly accessed. The entire status area must be read when the system is powered up, but the read time is short because the area is at the head of the word line. Furthermore, although it is necessary to access and write the status area in order to invalidate the data of a word line, the access time is also reduced.

(9) This embodiment is functionally compatible with commercial non-violate semiconductor memories. Because it can be accessed similarly to EEPROM in the random access mode, it can also be used as general-purpose EEPROM. In this case, the status and ECC parity areas are not accessed.

Consequently, with the present invention it is possible to execute a program by managing the program and data on a randomly accessible memory without loading the program into the main memory. With the randomly accessible memory according to the present invention, an external storage device can be made to match a disk unit well.

While the invention has been particularly shown and described with reference to preferred embodiments thereof, it will be understood by those skilled in the art that various changes in form and details may be made therein without departing from the spirit and scope of the invention.

What is claimed is:

1. A method for use with a computer system comprising a CPU that refers to virtual-real address translation tables, including a page table, and an external storage device, being a memory card that uses a rewritable and randomly accessible memory, wherein said external storage device is treated as being partitioned into logical pages when accessed as an I/O device, the size of the logical page is adjusted according to the size of a page managed by said CPU, and said logical pages of said external storage device are mapped to a real address space of said CPU, said logical pages being aligned with pages managed by said CPU, said method comprising the steps of:

building said page table for arranging addresses of said logical pages in a preferred sequence, said logical page containing a segment of an executable program, said executable program segments stored on said external storage device in a nonsequential order, said logical page addresses stored in said page table such that said executable program will execute in proper sequence;

setting write-prohibit flags to prohibit write operations on said logical pages of said external storage device arranged in said preferred sequence in said page table;

referring to said virtual-real address translation tables, including said page table, to read said executable program out of said external storage device by using said preferred sequence in said page table, thereby executing said program;

initiating a write-protect interrupt when a write operation is requested on a logical page for which the write-prohibit flag has been set;

copying said write-protected logical page into a main memory of said computer system; and conducting said requested write operation to said copy in said main memory, thereby allowing said executable program to resume on said write-protected logical page.

2. The method of claim 1, further comprising the step of referring to a file management area, which is managed by an operating system when said page table is built.

3. The method of claim 1, wherein the building and setting steps are initiated when the execution of said program is requested.

4. The method of claim 1, wherein logical pages of said external storage device are protected with error correction codes (ECCs) and said CPU, before the execution of said program, reads the program code into main memory and checks whether there is any error in the code by means of said ECCs.

5. The method of claim 4, further comprising the step of, if any error is found in the code, copying an erroneous logical page after the mapping to said CPU's real address space into the main memory of said computer system when a recoverable error is found, and registering the real address that points to the copied page in said page table in place of said erroneous logical page.

6. The method of claim 1, where said rewritable and randomly accessible memory has a first area in which user data are stored and a second area in which system data are stored, real addresses of said CPU being assigned only to said first area.

7. The method of claim 1, wherein said rewritable and randomly accessible memory is a flash EEPROM.

8. An apparatus for use in a computer system comprising a CPU that refers to virtual-real address translation tables, including a page table, and an external storage device being a memory card, that uses a rewritable and randomly accessible memory, wherein said external storage device is treated as being partitioned into logical pages when accessed as an I/O device, the size of the a page is managed by said CPU, and said logical pages of said external storage device are mapped to a real address space of said CPU, said apparatus comprising:

means for building said page table for arranging addresses of said logical pages in a preferred sequence, said logical page containing a segment of an executable program, said executable program segments stored on said external storage device in a non-sequential order, said logical page addresses stored in said page table such that said executable program will execute in proper sequence;

a plurality of write-prohibit flags, said flags set to prohibit write operations on said logical pages of said external storage device arranged in said preferred sequence in said page table means for referring to said virtual-real address translation tables, including said page table, to read said executable program out of said external storage device by using said preferred sequence in said page table thereby executing said program;

means for initiating a write-protect interrupt when a write operation is requested on a logical page for which the write-prohibit flag has been set;

means for copying said write-protected logical page into a main memory of said computer system: and means for conducting said requested write operation to said copy in said main memory, thereby allowing said executable program to resume on said write-protected logical page.

9. An computer system comprising:

a CPU that refers to virtual-real address translation tables, including a page table;

an external storage device, being a memory card that uses a rewritable and randomly accessible memory, wherein said external storage device partitioned into logical pages when accessed as an I/O device, the size of each logical page is adjusted according to the size of a page managed by said CPU, and said logical pages of said external storage device are mapped to a real address space of said CPU, said logical pages having boundaries aligned with boundaries of pages managed by CPU;

means for building said page table for arranging addresses of said logical pages in a preferred sequence said logical page containing a segment of an executable program, said executable program segments stored on said external storage device in a non-sequential order said logical page addresses stored in said page table such that said executable program will execute in proper sequence;

a plurality of write-prohibit flags, said flags set to prohibit write operations on said logical pages of said external storage device arranged in said preferred sequence in said page table means for referring to said virtual-real address translation tables, including said page table, to read said executable program out of said external storage device by using said preferred sequence in said page table thereby executing said program;

means for initiating a write-protect interrupt when a write operation is requested on a logical page for which the write-prohibit flag has been set:

means for copying said write-protected logical page into a main memory of said computer system: and means for conducting said requested write operation to said copy in said main memory, thereby allowing said executable program to resume on said write-protected logical page.

10. The computer system of claim 9, further comprising a main storage device and a disk device, said external storage device and said main storage device being connected to said CPU via a memory controller, and said external storage device and said disk device being connected to said CPU via a disk controller;

said means for building a page table accessing said external storage device via said disk controller and said means for referring to said page table accessing said external storage device via said memory controller.

11. The computer system of claim 10, wherein said means for building accesses said external storage device sequentially and said means for referring accesses said external storage device randomly.

* * * * *